No. 807,311. PATENTED DEC. 12, 1905.
R. B. PARKER.
TIRE FOR VEHICLES.
APPLICATION FILED FEB. 25, 1905.
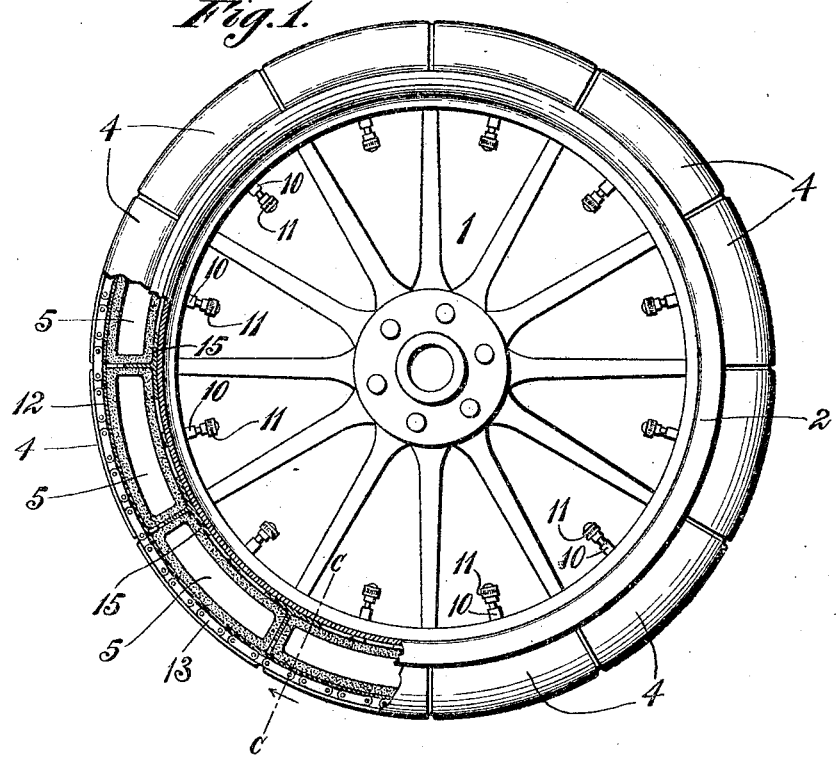
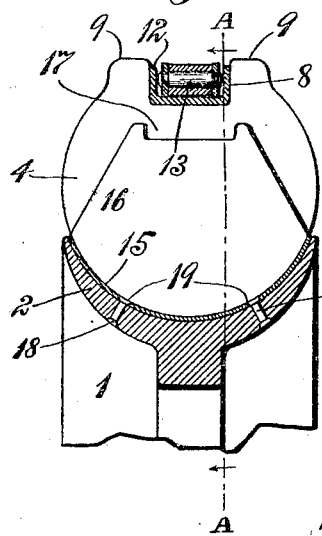
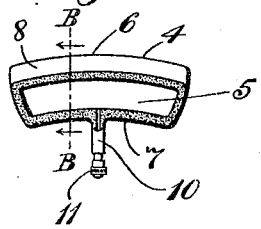
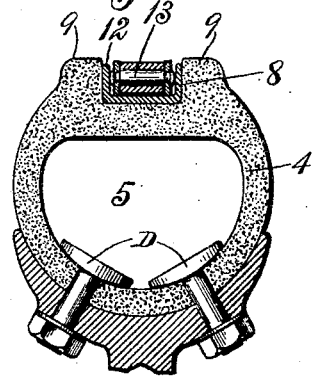
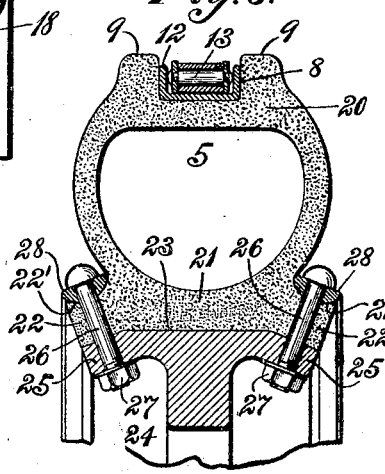
Witnesses:
H. E. Anderson
Frances E. Blodgett
Inventor:
Rienzi B. Parker,
By his Attorney,

UNITED STATES PATENT OFFICE.

RIENZI B. PARKER, OF HARTFORD, CONNECTICUT.

TIRE FOR VEHICLES.

No. 807,311.          Specification of Letters Patent.          Patented Dec. 12, 1905.

Application filed February 25, 1905. Serial No. 247,281.

*To all whom it may concern:*

Be it known that I, RIENZI B. PARKER, a citizen of the United States, residing at Hartford, in the county of Hartford and State of Connecticut, have invented certain new and useful Improvements in Tires for Vehicles, of which the following is a specification.

This invention relates to tires for vehicles, especially those of the pneumatic type, although in some details of construction it is not limited to said type.

All who enjoy the pleasures of the motor-vehicle or automobile and who utilize it for transporting goods in commercial establishments are aware of its numerous defects, paramount among which is the pneumatic tire as at present constructed. This tire is liable to puncture and to fracture, thereby causing a waste of time and patience and heavy expense for repairs or replacement. Extra tires are carried by the vehicles in order that they may be ready for application to the wheels when those in use or any of them collapse, due to accidents or wear, and frequently to afford temporary repairs unsightly patches are placed over the damaged part to retain the air, preserve the tire inflated, and prevent its collapse.

Primarily the invention is designed to obviate the defects of pneumatic tires, but is also applicable to solid tires, as will hereinafter appear.

A further object of the invention is the provision of grooved segments shaped to fit the felly and of separators placed between the adjacent ends of each pair of segments and each having a curved plate through which fastening devices are passed for securing them in place.

A further object of the invention is the provision of a metallic trough fitted in the grooves of the units and receiving the binder for securing said units to the felly.

Other objects of the invention will be set forth in the now following detailed description.

In the accompanying drawings, Figure 1 is a side elevation, partially in section, on line A A of Fig. 4 of a wheel equipped with my improved tire. Fig. 2 is a longitudinal vertical section, on a smaller scale, of one of the units of a pneumatic tire, the charging-nipple being in elevation. Fig. 3 is a perspective view of one of the separators. Fig. 4 is a transverse section on line C C of Fig. 1, parts being in elevation. Fig. 5 is a section on line B B of Fig. 2 looking in the direction of the arrow, and Fig. 6 is a transverse section of a modification hereinafter described.

Like numerals designate similar parts throughout the several views.

Referring to the drawings, the numeral 1 designates a wheel of any approved construction, having a concave felly 2.

Designated by the numeral 4 is the improved unit or segment of the tire, said unit having a chamber 5, in which a section of the usual inner tube (not shown) may be inserted, if desired. Each unit or section is provided with a longitudinal convex top surface 6 and with a longitudinal concave bottom surface 7, the latter conforming to the periphery of the felly 2, as shown in Figs. 1 and 5. Each unit is closed at the ends and is provided with a longitunal groove 8 and with projecting treads 9. (See Fig. 5.) A charging-nipple 10, fitted with the usual cap or closure 11, and valve (not shown,) is carried by each unit 4 when such are employed in constructing a pneumatic tire.

Designated by 12 is a flanged trough-like plate, bent circumferentially to accord with the periphery of the wheel and either made integral or in sections, as required. This plate fits in the grooves 8 of the units, the free ends of its flanges being slightly below the tread-surfaces 9 of the tire. On the bottom of this plate a circumferential binder (designated in a general way by 13) is placed for securing the units in place on the felly of the wheel. This binder is shown as a chain composed of links, and the length of said chain may be varied in any manner—for instance, by taking out or adding links until the desired tension thereof upon the flanged plates 12 and units 4 is obtained to hold said units firmly in place.

For separating the units to prevent endwise crowding and buckling any desired device may be employed, and I have shown for this purpose a concavo-convex plate 15, having a vertical flange 16, grooved at 17, to receive the trough-shaped plate 12 or the binder 13, should said plate be not employed when pressure is placed upon the tire or should it collapse from any cause. Inasmuch as the units composing the tire are manufactured of rubber or equivalent material, it is preferable to employ said plate or a suitable substitute therefor as a wear-resisting surface to protect the units. Rivets or other devices 18 are inserted in perforations 19 of plate 15 and serve to secure said plate to the felly 2, as shown in Fig. 4.

While in the present case a chain is shown as a binder, it is distinctly to be understood that any other device—such as a strap, belt, wire, rope, &c.—capable of accomplishing the result may be substituted therefor without departure from the invention. Bolts and nuts D may also be provided as additional fastening devices for the units, as shown in Fig. 5.

In the modification illustrated by Fig. 6 a pneumatic-tire unit 20 is shown, and this tire is the same in construction, with the exception of its base, as the preferred form of tire, and the parts thereof conforming to those found in the preferred construction are indicated by like numerals. This tire-section 20 is provided with a base 21, having longitudinal flanges 22 and a straight intermediate portion 23. A wheel 24, having a felly with inclined circumferential flanges 25, is provided to carry this form of unit, and the flanges 22 and 25 are perforated to receive bolts 26, held in place by nuts 27, bearing against the under sides of the flanges 25. On their top surfaces each flange 22 is concaved at 22' to receive circumferential clamping-rings 28, each having a convex under surface fitting in the concave recess 22' of the flange 22, each clamping-ring being perforated to receive the bolts 26, the heads of which bear against the flat upper surfaces of said clamping-rings.

As will be observed from all of the views, the projections 9 9 extend from the thickened tread portion of the tire-section to a point above the binder 13 and the plate 12, and consequently protect said tire-section against puncture. Furthermore, as the groove for the reception of the trough and binder is formed in the reinforced wear part of the unit no weakening effect is produced by said groove.

In all of the views the units 4 are shown distended by pneumatic pressure each to the same extent, so that when assembled on the felly they will form a complete tire having throughout an even tread.

In assembling the parts of my improved tire the separating devices or spacers 15 are secured to the felly by the rivets 18 or other devices at the desired distance apart, and the units 4 are placed in position upon said felly with their ends abutting against the separators, after which the flanged plate 12 and the binder 13 are inserted in the grooves 8. The tension of the binder is adjusted to clamp the units firmly to the felly, and the tire is ready for use.

While the units or sections 4 and 20 may be of any desired lengths, I have shown each of a dimension longitudinally to extend from one spoke to another of the wheel, a separator 15 being secured to the felly at a point opposite each of said spokes. It is distinctly to be understood, however, that the length of the units or sections may be varied within wide limits and that the size and form of said units may be changed from what is shown without departure from the invention.

A number of uncharged units may be conveniently stored in lockers or elsewhere about the carriage-body, and should one collapse from any cause it may readily be removed and replaced by a new unit. Should a unit collapse, as stated, the binder spanning it will receive the stress of the load and will then act as a part of the tread, so that it is feasible to continue the journey without replacing the collapsed unit, if desired. Solid tires may also be constructed on the unit principle, if desired, and should a section of such a tire receive damage it can readily be replaced by a substitute in the manner described.

In the construction illustrated in Fig. 6 to remove a damaged unit the nuts 27 are withdrawn and the bolts 26 removed, when the section can readily be taken from its seat on the felly and replaced by a substitute.

Changes may be made in the various details of the invention without departure from the invention. To tires generally the invention relates, and it is limited to no special kind of tire nor to any special use of such tire.

Having thus described my invention, what I claim is—

1. The combination, with a wheel, of a plurality of tire units each conforming to the periphery of said wheel; a circular binder for clamping the units to the wheel; and devices secured to the wheel and serving to separate the units from each other.

2. The combination, with a wheel, of grooved tire units; a wear-resisting device inserted in the groove of each unit; and a circumferential binder for securing the units to the wheel, said binder serving as a tread-surface should any of the units collapse.

3. The combination, with a wheel, of tire units fitted to the periphery thereof; separators secured to, and projecting from, said periphery between each pair of tire units; and a metallic binder for securing the tire units to said periphery, said binder serving as a tread-surface should any of the units collapse.

4. The combination, with a wheel, of a plurality of tire units, each having a groove; a flanged wear-resisting device passing through each groove; and a circumferential binder bearing against said wear-resisting device, and serving to secure the units to said wheel.

5. The combination, with a wheel, of pneumatic-tire units secured to the periphery thereof; a circumferential binder; and separating devices projecting from the felly, and each having a notch to receive the binder, should one of the units collapse.

6. The combination, with a vehicle-wheel, of a series of pneumatic-tire units arranged circumferentially thereof, and each having a groove and a tread portion on each side of said groove; a wear-resisting device passing through each groove; a binder fitted over the wear-resisting device; and separators for sustaining said binder when a unit collapses.

7. The combination, with a vehicle-wheel, of a series of separators spaced apart on, and secured to, the rim thereof; a series of grooved tire units curved to conform to the rim, and prevented from engaging each other by said separators; and a binder fitted in the grooves of the units below the tread, and serving to fasten said units to said rim.

In testimony whereof I affix my signature in presence of two witnesses.

RIENZI B. PARKER.

Witnesses:
FRANCES E. BLODGETT,
F. E. ANDERSON.